United States Patent
Hecking et al.

(10) Patent No.: US 10,428,174 B2
(45) Date of Patent: Oct. 1, 2019

(54) POLYISOCYANATE MIXTURE BASED ON 1,5-DIISOCYANATOPENTANE

(71) Applicant: Covestro Deutschland AG, Leverkusen (DE)

(72) Inventors: Andreas Hecking, Langenfeld (DE); Christoph Eggert, Köln (DE); Jan Weikard, Leverkusen (DE); Gesa Behnken, Köln (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 190 days.

(21) Appl. No.: 15/567,720

(22) PCT Filed: Apr. 18, 2016

(86) PCT No.: PCT/EP2016/058573
§ 371 (c)(1),
(2) Date: Oct. 19, 2017

(87) PCT Pub. No.: WO2016/169895
PCT Pub. Date: Oct. 27, 2016

(65) Prior Publication Data
US 2018/0201719 A1  Jul. 19, 2018

(30) Foreign Application Priority Data
Apr. 21, 2015 (EP) .................... 15164457

(51) Int. Cl.
| | | |
|---|---|---|
| *C08G 18/73* | (2006.01) | |
| *C08G 18/62* | (2006.01) | |
| *C08G 18/79* | (2006.01) | |
| *C08G 18/02* | (2006.01) | |
| *C09D 175/04* | (2006.01) | |
| *C09D 7/63* | (2018.01) | |
| *C08G 18/08* | (2006.01) | |

(52) U.S. Cl.
CPC ........... *C08G 18/73* (2013.01); *C08G 18/022* (2013.01); *C08G 18/0852* (2013.01); *C08G 18/622* (2013.01); *C08G 18/792* (2013.01); *C09D 7/63* (2018.01); *C09D 175/04* (2013.01)

(58) Field of Classification Search
CPC .... C08G 18/622; C08G 18/73; C08G 18/792; C08G 18/0852; C08G 18/022; C09D 175/04; C09D 7/63

USPC ........................................................ 524/459
See application file for complete search history.

(56) References Cited

U.S. PATENT DOCUMENTS

| | | |
|---|---|---|
| 4,847,408 A | 7/1989 | Frosch et al. |
| 5,126,170 A | 6/1992 | Zwiener et al. |
| 5,369,207 A | 11/1994 | Wolff et al. |
| 5,914,383 A | 6/1999 | Richter et al. |
| 6,706,913 B2 | 3/2004 | Leimkühler et al. |
| 6,838,578 B2 | 1/2005 | Leimkühler et al. |
| 6,930,199 B2 | 8/2005 | Meyn et al. |
| 6,974,880 B2 | 12/2005 | Biskup et al. |
| 7,019,164 B2 | 3/2006 | Friedrich et al. |
| 8,044,166 B2 | 10/2011 | Fiene et al. |
| 8,258,337 B2 | 9/2012 | Woelfert et al. |
| 8,692,016 B2 | 4/2014 | Sanders et al. |
| 9,376,404 B2 | 6/2016 | Nakagawa et al. |
| 2009/0292100 A1 | 11/2009 | Fiene et al. |
| 2013/0338330 A1 | 12/2013 | Nakagawa et al. |

FOREIGN PATENT DOCUMENTS

| | | |
|---|---|---|
| CA | 1335990 C | 2/1989 |
| DE | 1493360 B1 | 1/1970 |
| GB | 1225450 | 3/1971 |
| JP | 2010121011 A | 6/2010 |
| JP | 2010254764 A | 11/2010 |
| JP | 2010265364 A | 11/2010 |
| JP | 2011201863 A | 10/2011 |
| JP | 2012152202 A | 8/2012 |
| JP | 2013060542 A | 4/2013 |

OTHER PUBLICATIONS

Siefken, W.; Justus Liebigs Annalen Der Chemie; "Mono- und Polyisocyanate IV. Mitteilung uber Polyisocyanate*)"; 562.Band; pp. 76-136; Dec. 11, 1948; Leverkusen, Germany.
Laas et al.; "The Synthesis of Aliphatic Polyisocyanates Containing Biuret, Isocyanurate or Uretdione Backbones for Use in Coatings", J. Prakt. Chem; pp. 185-200, vol. 336.; (1994); Leverkusen, Germany.

*Primary Examiner* — Angela C Scott
(74) *Attorney, Agent, or Firm* — Donald R. Palladino

(57) ABSTRACT

The invention relates to a polyisocyanate mixture containing at least one polyisocyanate based on 1,5-diisocyanatopentane and at least one organic solvent, said organic solvent being inert with respect to isocyanate groups and the polyisocyanate mixture has a solid body content of ≥35 and ≤65 wt. %. The invention also relates to a two-component system, to a method for producing a coating, to the thus obtained coatings and to a composite consisting of the coating and a substrate.

20 Claims, 1 Drawing Sheet

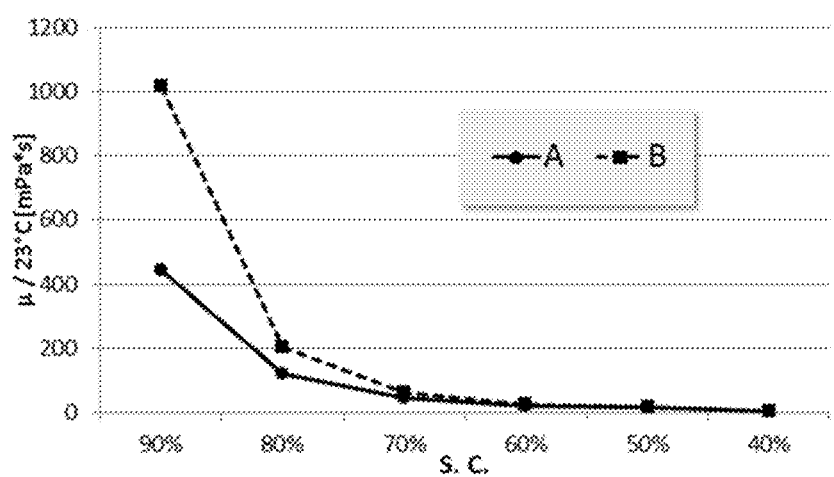

POLYISOCYANATE MIXTURE BASED ON 1,5-DIISOCYANATOPENTANE

CROSS-REFERENCE TO RELATED APPLICATIONS

This application is a national stage application under 35 U.S.C. § 371 of PCT/EP2016/058573, filed Apr. 18, 2016, which claims the benefit of European Application No. 15164457.2, filed Apr. 21, 2015, both of which are being incorporated by reference herein.

FIELD

The invention relates to a polyisocyanate mixture based on 1,5-diisocyanatopentane. Further subjects of the invention are a two-component system comprising the polyisocyanate mixture, a method for producing a coating. Furthermore, the coating, a use of the two-component system for producing a coating on a substrate, and an assembly composed of the coating and a substrate are further subjects of the invention.

BACKGROUND

Two-component polyurethane coatings are long-established. For high-quality lightfast topcoat materials, coatings employed are, in particular, those formed from aliphatic polyisocyanates and polyols such as, for example, polyacrylate polyols, polyester polyols or polycarbonate polyols. Polyisocyanates employed for these high-quality coatings are, in particular, low-monomer-content derivatives prepared from hexamethylene 1,6-diisocyanate (HDI). Particularly suitable for elastic, highly robust coatings are isocyanurate polyisocyanates of HDI, or HDI polyisocyanates containing iminooxadiazinedione and isocyanurate structures, of the kind described for example in H. J. Laas, R. Halpaap, J. Pedain, J. prakt. Chem. 1994, 336, 185-200 or in EP 0330966 B1 or EP 0798299 B1. These polyisocyanates generally have isocyanate functionalities ($F_{NCO}$) of 3 or more, where isocyanate functionality is understood as the average number of NCO groups per molecule.

Besides HDI, 1,5-diisocyanatopentane (PDI) is another long-established monomer, as described for example by W. Siefken, Liebigs Ann. Chem. 1949, 562, page 122 or in DE 1493360 B1 and DE 1900514 A1.

The greatest part of the areas of application, in volume terms, are covered by solventborne one-component and two-component polyurethane coating materials. Within the broad spectrum of industrial application, these materials are applied usually by suitable spraying methods. Serving as a reference point in the respective application, as a general rule, is the solids content at spray viscosity. Too low a solids content is manifested, for example, in a poorer hiding power and/or lower filling force or reduced productivity.

In order to go along with the trend of increasing requirements with regard to environmental protection, the coatings industry has increasingly undertaken efforts to provide particularly low-viscosity polyisocyanates. A disadvantage of such low-molecular systems is that at the preparation stage, the polymer reaction has to be terminated while still at a very low degree of polymerization of the monomer, in order to achieve the required viscosity.

It is indeed possible for the low-molecular polyisocyanate to be separated by suitable methods from the excess monomer, and for the monomer retained to be replaced by the amount of that polymerized with new monomer, and reacted again. Overall, however, this has a significantly adverse influence on the space-time yield of such a preparation process.

DE 19611849 discloses reducing the viscosity of the polyisocyanate thus prepared through the deliberate simultaneous synthesis of symmetrical and asymmetrical polyisocyanurate structures, although the solids fractions realizable by this means in formulated coating systems are no more than marginally higher. The efforts in stated texts at reducing viscosity have therefore not achieved the desired effect of significant reduction in the solvent fraction in coating formulations. Moreover, the disadvantageous space-time yield has remained unresolved.

Accordingly, it continued to be desirable to be able to realize the aforementioned positive properties of a high space-time yield with a maximum amount of reactive isocyanate groups and with the solids contents at spray viscosity that are required by the coatings industry, in coating formulations comprising a polyisocyanate.

SUMMARY

It was an object of the present invention, therefore, to provide a polyisocyanate mixture which in its preparation is notable for an optimized space-time yield and for a very high level of reactive isocyanate groups, while at the same time fulfilling the solids contents at spray viscosity that are required by the coatings industry in coating formulations.

This object has been achieved in accordance with the invention by means of a polyisocyanate mixture comprising at least one polyisocyanate based on 1,5-diisocyanatopentane and at least one organic solvent, the organic solvent being inert toward isocyanate groups, and the polyisocyanate mixture having a solids content of ≥35 and ≤65 wt %.

BRIEF DESCRIPTION OF THE DRAWING

FIG. 1 shows the so-called dilution series of the two polyisocyanate mixtures A (comparative example, solid line) and B (inventive example, dashed line).

DETAILED DESCRIPTION

A polyisocyanate mixture is presently understood to be a mixture which may be, for example, a solution, suspension or emulsion. The appearance of the mixture may vary according to which polyisocyanates and organic solvents are included, although solutions are preferred.

The space-time yield is presently understood as the specific production output, which then, as a mass, is placed in relation to another measurable variable (e.g. cubic meter, hour). In the case of isocyanate oligomerizations, the ratio of the monomeric diisocyanate reacted to the amount of polyisocyanate prepared therefrom is an established measure of the specific production output.

Furthermore, for example, in the case of isocyanate oligomerization, the arithmetically determinable degree of polymerization may be employed as a measure of the specific production output.

The degree of polymerization refers presently to the percentage of the isocyanate groups originally present in the starting mixture that is consumed in the course of the reaction according to the invention. The degree of polymerization in percent can be calculated according to the following formula:

degree of polymerization=(NCO start NCO end)/
NCO start×100

The isocyanate group content may be determined by means of titrimetry in accordance with DIN EN ISO 11 909, for example.

Spray viscosity refers presently to the required viscosity of the coating system that is formulated for processing by squirting or spraying. The spray viscosity is measured and set prior to actual use in the spray gun or automated coating system, by determination of the flow time of a specialty flow cup filled with the coating system.

In a first preferred embodiment, the polyisocyanate has a degree of polymerization of ≥20%, preferably of ≥25%, and more preferably of ≥30%. One advantage of this is that the space-time yield can be improved still further. The aforementioned degrees of polymerization are achieved in general after a reaction time of 30 minutes to 30 hours, preferably of 1 to 8 hours, more preferably of 2 to 6 hours. The reaction may be discontinued, for example, when the target degree of polymerization has been reached.

Suitable polyisocyanate based on 1,5-diisocyanatopentane comprises any desired oligomeric polyisocyanates obtainable by modification of 1,5-diisocyanatopentane and having uretdione, isocyanurate, allophanate, biuret, iminooxadiazinedione and/or oxadiazinetrione structure, or any desired mixture of such PDI polyisocyanates. These polyisocyanates are prepared by conventional methods of isocyanate oligomerization, as described for example in J. Prakt. Chem. 336 (1994) 185-200 and EP-A 0 798 299, by reaction of a part of the isocyanate groups in the PDI to form polyisocyanate molecules consisting of at least two diisocyanate molecules, and by generally subsequent removal of the unconverted monomeric PDI by distillation or extraction. In one embodiment of the invention, therefore, they consist of the starting components, the reaction products, and any small residual monomer amounts of 1,5-diisocyanatopentane. Specific examples of such oligomeric PDI polyisocyanates are found for example in EP-A 2 418 198, EP-A 2 684 867, JP 2010-121011, JP 2010-254764, JP 2010-265364, JP 2011-201863, JP 2012-152202, JP 2013-060542.

It is particularly preferred, moreover, if the residual monomer content of 1,5-diisocyanatopentane in the polyisocyanate is below 0.5 wt %, preferably below 0.3 wt %. Residual monomer contents can be determined by gas chromatography, for example, in accordance with DIN EN ISO 10283.

The 1,5-diisocyanatopentane employed for the preparation of the polyisocyanate is obtainable in a variety of ways, as for example by phosgenation in the liquid phase or gas phase or by a phosgene-free route, as for example by thermal urethane cleavage, starting from 1,5-diaminopentane which has preferably been attained biotechnologically by decarboxylation of the naturally occurring amino acid lysine.

It is particularly preferred in this case if the 1,5-diisocyanatopentane is obtained by phosgenation of 1,5-diaminopentane in the gas phase. The phosgenation of amines in the gas phase is known per se and may take place for example as described in EP 0 289 840 B1, EP 1 319 655 A2, EP 1 555 258 A1, EP 1 275 639 A1, EP 1 275 640 A1, EP 1 449 826 A1, EP 1 754 698 B1, DE 10 359 627 A1 or in German patent application DE 10 2005 042392 A1.

In the preparation of the polyisocyanate, besides 1,5-diisocyanatopentane, it is possible optionally to make additional use of further diisocyanates having aliphatically, cycloaliphatically, araliphatically and/or aromatically bonded isocyanate groups. These diisocyanates are, in particular, those from the molecular weight range 140 to 400, such as, for example, 1,4-diisocyanatobutane, 1,6-diisocyanatohexane (HDI), 2-methyl-1,5-diisocyanatopentane, 1,5-diisocyanato-2,2-dimethylpentane, 2,2,4- and/or 2,4,4-trimethyl-1,6-diisocyanatohexane, 1,10-diisocyanatodecane, 1,3- and 1,4-diisocyanatocyclohexane, 2,4- and 2,6-diisocyanato-1-methylcyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 2,4'-diisocyanatodicyclohexylmethane, 1-isocyanato-1-methyl-4(3)isocyanatomethylcyclohexane, bis(isocyanatomethyl)-norbornane, 1,3- and 1,4-bis(isocyanatomethyl)benzene (XDI), 1,3- and 1,4-bis(2-isocyanatoprop-2-yl)benzene (TMXDI), 2,4- and 2,6-diisocyanatotoluene (TDI), 2,4'- and 4,4'-diisocyanatodiphenylmethane (MDI), 1,5-diisocyanatonaphthalene, or any desired mixtures of such diisocyanates.

These diisocyanates for possible accompanying use during the preparation of the polyisocyanate are likewise obtainable, for example, by phosgenation in the liquid phase or gas phase and are employed, if at all, in amounts of up to 80 wt %, preferably up to 50 wt %, more preferably up to 20 wt %, based on the total amount of diisocyanates employed. Where aforementioned diisocyanates are optionally used as well it is further preferred if the residual monomer content of the diisocyanates used in the polyisocyanate is below 0.5 wt %, preferably below 0.3 wt %.

In general the polyisocyanates have an average isocyanate functionality of 1.8 to 9.2, preferably of 1.8 to 8.0, more preferably of 2.0 to 7.0, and very preferably of 2.3 to 6.0, and/or an isocyanate group content of 5.0 to 26.0 wt %, preferably 6.0 to 24.0 wt %, and more preferably of 10.0 to 23.0 wt %.

Especially preferably polyisocyanates are polyisocyanates prepared using 1,5-diisocyanatopentane as sole diisocyanate and having an average NCO functionality of 2 to 9, preferably of 2.3 to 7.5, and more preferably of 2.5 to 6. They further have an isocyanate group content of 15.0 to 27.25 wt %, preferably of 17.0 to 24.0 wt %, and more preferably of 19.0 to 23.0 wt %, based on the total weight of polyisocyanate in the polyisocyanate mixture. Furthermore, they have a monomeric 1,5-diisocyanatopentane content of less than 1.0 wt %, preferably of less than 0.5 wt %, and more preferably of less than 0.3 wt %.

It is likewise especially preferred if the especially preferred, moreover, polyisocyanates above comprise isocyanurate structures. It is further especially preferred if the polyisocyanate mixture consists exclusively of the aforementioned, especially preferred polyisocyanates and at least one organic solvent. One of the advantages of this is that the rheological properties of the polyisocyanate mixture of the invention can be improved still further by the single use of PDI as the diisocyanate employed.

The preparation of the polyisocyanates is preferably carried out solventlessly. Optionally, however, it is also possible for suitable solvents, inert toward the reactive groups of the starting components, to be used as well. Examples of suitable solvents are the customary paint solvents known per se and given below. For deliberate modification of 1,5-diisocyanatopentane, however, it is also possible for solvents having groups that are reactive toward isocyanate groups to be employed, such as alcohols, for example, said groups reacting with the isocyanate groups of the PDI to form urethane and/or allophanate groups.

When the desired degree of polymerization has been reached, the reaction of the isocyanate groups can be terminated, for example, by cooling of the reaction mixture to room temperature. In general, however, the reaction is ended by addition of a catalyst poison and optional subsequent brief heating of the reaction mixture to a temperature, for example, which is above 80° C.

Examples of suitable catalyst poisons are inorganic acids such as hydrochloric acid, phosphorous acid or phosphoric acid, acyl chlorides such as acetyl chloride, benzoyl chloride or isophthaloyl dichloride, sulfonic acids and sulfonic esters, such as methanesulfonic acid, p-toluenesulfonic acid, trifluoromethanesulfonic acid, perfluorobutanesulfonic acid, dodecylbenzenesulfonic acid, methyl and ethyl p-toluenesulfonates, monoalkyl and dialkyl phosphates such as monotridecyl phosphate, dibutyl phosphate, and dioctyl phosphate, and also silylated acids, such as trimethylsilyl methanesulfonate, trimethylsilyl trifluoromethanesulfonate, tris(trimethylsilyl) phosphate, and diethyl trimethylsilyl phosphate.

The amount of the catalyst poison needed in order to end the reaction is guided by the amount of catalyst used; in general, an equivalent amount of the catalyst poison is used, based on the catalyst employed at the start. Taking account, however, of any losses of catalyst occurring in the course of the reaction, it is possible for just 20 to 80 equivalent-% of the catalyst poison to be sufficient to end the reaction, based on the amount of catalyst originally employed.

The stated catalyst poisons may be used both in bulk and in solution in a suitable solvent. If a solvent is employed for dissolving the catalyst poison, preference is given to using 1,5-diisocyanatopentane. The degree of dilution may be selected freely within a very wide range; suitability is possessed, for example, by solutions with a concentration upward of ≥25 wt %, preferably ≥10 wt %.

After reaction is at an end, the polyisocyanate is freed from volatile constituents (excess monomeric isocyanate components and any solvents used) preferably by means of thin-film distillation under reduced pressure, as for example at a pressure of below 1.0 mbar, preferably below 0.75 mbar, more preferably below 0.25 mbar, under extremely gentle conditions, as for example at a temperature of 100 to 200° C., preferably of 120 to 180° C.

As an alternative to the aforementioned thin-film distillation, the stated volatile constituents may be removed from the polyisocyanate by extraction with suitable solvents that are inert toward isocyanate groups, examples being aliphatic or cycloaliphatic hydrocarbons such as pentane, hexane, heptane, cyclopentane or cyclohexane.

In a further preferred embodiment, the organic solvent is selected from the group of aromatic or aliphatic alkanes, alkenes, esters, ethers, nitriles, and ketones.

Suitable organic solvents are generally the customary paint solvents which are known per se and which are inert toward isocyanate groups. These include, for example, ethyl acetate, butyl acetate, ethylene glycol monomethyl or monoethyl ether acetate, 1-methoxyprop-2-yl acetate (MPA), 3-methoxy-n-butyl acetate, acetone, 2-butanone, 4-methyl-2-pentanone, cyclohexanone, toluene, xylene, chlorobenzene, white spirit, aromatics with higher degrees of substitution, of the kind in commerce for example under the names solvent naphtha, Solvesso®, Isopar®, Nappar® (Deutsche EXXON CHEMICAL GmbH, Köln, DE), and Shellsol® (Deutsche Shell Chemie GmbH, Eschborn, Del.), carbonic esters, such as dimethyl carbonate, diethyl carbonate, 1,2-ethylene carbonate, and 1,2-propylene carbonate, lactones, such as β-propiolactone, γ-butyrolactone, ε-caprolactone, and ε-methylcaprolactone, and also solvents such as propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such organic solvents. Preferred organic solvents are ethyl acetate, butyl acetate, 1-methoxyprop-2-yl acetate (MPA), xylene or solvent naphtha, or any desired mixtures of the aforesaid preferred organic solvents.

If the composition of the material is known, as for example the composition of a laboratory formula for tests, then the solids content (also called nonvolatile fraction, NVF) can be calculated completely without prior determination. A precondition, however, is that all solids contents of the raw materials used in the formula are known.

The solids contents may be adjusted through the corresponding ratio of the polyisocyanate to the organic solvent and/or the polyisocyanates to the organic solvents.

In the case of a coating material, the solids content is defined as the fraction of a coating composition which remains when all of the volatile constituents have evaporated. It is generally composed of the film-forming binder, the pigments, and the fillers. The higher the solids content at spray viscosity, the more rapid the attainment of the film thickness of the applied coating that is necessary for substrate protection.

It is further preferred here if the polyisocyanate mixture of the invention at a solids content of ≥35 and ≤65 wt % has a viscosity at 23° C. of ≥3 and ≤500 mPa*s, preferably of ≥4 and ≤400 mPa*s. An advantage of this is that the polyisocyanate mixture of the invention is especially suitable for the formulation of coating materials, since it achieves the requisite low viscosities at the solids contents employed.

The viscosity is determined according to DIN EN ISO 3219 at 23° C. for example.

A combination of the first preferred embodiment with the above-stated solids contents of the polyisocyanate mixture of the invention is especially preferred, moreover, since it further reinforces the particular advantage of a very high space-time yield of the polyisocyanates with, surprisingly, viscosities that are equally low for the solids contents, employed for application, of the polyisocyanate mixture of the invention.

In a further preferred embodiment, the polyisocyanate mixture of the invention is produced by mixing at least one of the aforementioned polyisocyanates with at least one of the aforementioned organic solvents.

The polyisocyanate mixture of the invention is suitable for a multiplicity of applications. Accordingly, the polyisocyanate mixture may be reacted via the reactive isocyanate groups it contains, with compounds, for example, which carry groups reactive toward isocyanate groups.

Consequently, a two-component system comprising a component I), comprising at least one polyisocyanate mixture of the invention and also, optionally, further auxiliaries and adjuvants, and a component II), comprising at least one binder that is reactive toward isocyanate groups, and also, optionally, further auxiliaries and additives, is a further subject of the present invention.

In a further preferred embodiment, the binder that is reactive toward isocyanate groups comprises at least one amino-, thio- and/or hydroxy-functional compound, preferably at least one hydroxy-functional compound. Also included are compounds with mixed functionality. Such compounds may have hydroxyl groups and thio groups equally, for example.

Examples of suitable hydroxy-functional compounds are polyether polyols, polyester polyols, polycarbonate polyols or polyacrylate polyols. Examples of suitable thio-functional compounds are pentaerythritol tetra(3-mercaptopropionate), trimethylolpropane tri(3-mercaptopropionate), pentaerythritol tetramercaptoacetate, and trimethylolpropane trimercaptoacetate.

As amino-functional compounds it is possible for example to use polyamines, such as the polyaspartic acid derivatives known from EP-B 0 403 921, for example, or else polyamines the kind whose amino groups are present in blocked form, such as polyketimines, polyaldimines or oxazolanes, for example. Under the influence of moisture, these blocked amino groups form free amino groups and also, in the case of the oxazolanes, form free hydroxyl groups, which are reacted by consumption with the isocyanate groups of the polyisocyanate mixture of the invention, with crosslinking.

A further subject of the present invention is a method for producing a coating by mixing and optionally curing, with heating, the two-component system of the invention.

If compounds with mixed functionality are used, then the coatings obtained may also feature urea, thiourethane and/or hydroxyl groups, depending on which functional groups these compounds of mixed functionality contain.

A coating produced or producible from the two-component system of the invention by the method of the invention is a further subject of the present invention.

The formulated two-component system may optionally be admixed with further auxiliaries and adjuvants that are customary in the coatings sector. Examples of suitable auxiliaries and adjuvants in this context are flow control assistants, color pigments, fillers, matting agents, inorganic or organic pigments, light stabilizers, coatings additives, such as dispersants, thickeners, defoamers, and other auxiliaries, such as tackifying agents, fungicides, bactericides, stabilizers or inhibitors, and catalysts or emulsifiers.

In the production of the two-component system from the polyisocyanate mixture of the invention, the stated isocyanate-reactive binders are used generally in amounts corresponding to an equivalent ratio of isocyanate groups relative to groups reactive tow and isocyanate groups of 2:1 to 0.5:1, preferably of 1.5:1 to 0.8:1, more preferably of 1.1:1 to 0.9:1.

Mixing of the polyisocyanate mixture of the invention with the binder that is reactive toward isocyanate groups may be accomplished by simple stirring together prior to the processing of the two-component system by any desired methods, by using mechanical tools known to the skilled person, or else using two-component spray guns.

In a further preferred embodiment, above two-component systems may produce, simply on room-temperature drying, coatings that are of hard gloss, hard and elastic, and distinguished by outstanding solvent resistances. It is, however, also possible for these two-component systems to be dried under forced conditions at elevated temperature or by baking at temperatures up to 260° C.

The two-component systems based on the polyisocyanate mixture of the invention may be applied to any desired substrates by known methods such as, for example, by spraying, spreading, flow coating, or by means of rollers or doctor blades.

Consequently, the use of the two-component system of the invention for producing a coating on a substrate is a further subject of the invention.

Substrates contemplated for the two-component systems formulated with the aid of the polyisocyanate mixture of the invention are any desired substrates which have a surface made for example of metal, wood, rigid and flexible plastics, glass, or stone, but also substrates such as, for example, ceramic materials, concrete, textiles, leather, and paper, which prior to coating may optionally also be provided with customary primers, are suitable substrates. The substrates preferably have a surface made of metal, wood and/or plastic. The advantageous viscosity properties of the polyisocyanate mixture of the invention are manifested not only on application by spraying but also in the case of the other kinds of application.

A further subject of the invention is an assembly composed of a coating of the invention and a substrate having a surface of metal, wood and/or plastic.

The invention is elucidated in more detail with examples below.

Examples

FIG. 1: Viscosity profile of inventive polyisocyanate mixture B and of polyisocyanate mixture A as comparative example All percentages are by weight unless otherwise noted.

The NCO contents were determined by titrimetry according to DIN EN ISO 11909.

The residual monomer contents were measured according to DIN EN ISO 10283 by gas chromatography with internal standard.

The viscosities were investigated on the one hand using an MCR301 rheometer from AntonPaar, employing the CC27 cup/rotor system with the C-PTD200 Peltier heating. Within the determination of viscosity, the following measurement profile was investigated: ramp log of D=1-100 1/s, T=23° C.

On the other hand, the flow times were determined according to standard DIN EN ISO 2431 in the DIN 4 cup.

Chemicals Used

Dibutyl phosphate (Sigma Aldrich)
2-Ethylhexan-1-ol (Sigma Aldrich)
N,N,N-Trimethyl-N-benzylammonium hydroxide (40% solution in methanol) (Sigma Aldrich)

The following commercially available products were used for comparing the viscosities:

Butyl acetate (Azelis Deutschland GmbH, Sankt Augustin)

The following commercially available polyacrylates employed for the example formulations for determining the realizable solids contents: Setalux® D A 870 (as-supplied form 70% in butyl acetate, OH content 2.93%) and Setalux® D A 665 (as-supplied form 60% in butyl acetate/xylene, OH content 2.98%) from Nuplex Resins GmbH Bitterfeld, Germany.

Polyisocyanate A (Example A, Comparative Example)

A four-neck flask equipped with stirrer, reflux condenser, $N_2$ transit tube and internal thermometer was charged with 1092 g (6.49 mol) of hexamethylene 1,6-diisocyanate (HDI), degassed three times at room temperature and aerated with nitrogen. The batch was subsequently heated to 60° C. and 6.0 ml of the catalyst solution (1.5% solution of N,N,N-trimethyl-N-benzylammonium hydroxide in methanol and 2-ethylhexanol) were metered in at a rate such that the exothermic trimerization was maintained at a temperature of 60-80° C. When an NCO content of 40.8 wt % was reached, the reaction was halted with dibutyl phosphate (equimolar amount, based on trimethylbenzylammonium hydroxide employed) and the excess PDI was removed by thin-film distillation at 140° C. and a pressure of 0.5-0.6 mbar.

The resulting resin quantity of 338 g had an NCO content of 21.8%, a residual monomer content of 0.3%, and a viscosity of 3000 mPa*s at 23° C.

Determined as a measure of the specific production output was the ratio of monomeric diisocyanate employed to polyisocyanate obtained, which was 3.23. The reciprocate of this in percent represents the resin yield and is 31%. The arithmetic degree of polymerization for the HDI polyisocyanate is 18.4%.

Polyisocyanate B (Example B, Inventive Example)

A four-neck flask equipped with stirrer, reflux condenser, $N_2$ transit tube and internal thermometer was charged with 1000 g (6.49 mol) of pentamethylene 1,5-diisocyanate (PDI), degassed three times at room temperature and aerated with nitrogen. The batch was subsequently heated to 60° C. and 9.0 ml of the catalyst solution (1.5% solution of N,N,N-trimethyl-N-benzylammonium hydroxide in methanol and 2-ethylhexanol) were metered in at a rate such that the exothermic trimerization was maintained at a temperature of 60-80° C. When an NCO content of 36.7 wt % was reached, the reaction was halted with dibutyl phosphate (equimolar amount, based on trimethylbenzylammonium hydroxide employed) and the excess PDI was removed by thin-film distillation at 140° C. and a pressure of 0.5-0.6 mbar.

The resulting resin quantity of 510 g had an NCO content of 21.7%, a residual monomer content of 0.3%, and a viscosity of 10 000 mPa*s at 23° C.

Determined as a measure of the specific production output was the ratio of monomeric diisocyanate employed to polyisocyanate obtained, which was 1.96. The reciprocate of this in percent represents the resin yield and is 51%. The arithmetic degree of polymerization of the inventive polyisocyanate is 32.6%.

Investigating the Viscosity of Polyisocyanate Mixtures

FIG. 1 shows the so-called dilution series of the two polyisocyanate mixtures A (comparative example, solid line) and B (inventive example, dashed line). In this case, solutions (butyl acetate as organic solvent) with decreasing solids content are prepared from the respective polyisocyanate mixtures, and subsequently, after thorough mixing, the viscosity is investigated using the MCR301 rheometer from AntonPaar in a cup/rotor system (CC27).

TABLE 1

Results of the rheological investigation of the polyisocyanate mixtures

| Product | Equivalent weight | Solids content (as-supplied form) | 1 (inventive) | 2 (comparative example) | 3 (inventive) | 4 (comparative example) |
|---|---|---|---|---|---|---|
| Polyacrylate | | | | | | |
| Setalux D A 870 BA | 580 | 70 | 116 | 116 | | |
| BUTYL ACETATE | | | 69 | 67 | 73 | 73 |
| Polyisocyanate | | | | | | |
| Polyisocyanate A | 193 | 100 | | 38.6 | | 38.6 |
| Polyisocyanate B | 195 | 100 | 39 | | 39 | |
| Flow time in DIN4 cup | | | 20 sec. | 20 sec. | 20 sec. | 20 sec. |
| Solids content [%] | | | 53.7 | 54.1 | 47.5 | 47.4 |
| Ratio NCO/OH | | | 1.0 | 1.0 | 1.0 | 1.0 |

In table 1, formulations 1 to 4 were prepared with the two polyisocyanates A (comparative example) and B (inventive example) and two different polyacrylates from Nuplex Resins GmbH Bitterfeld in an NCO/OH ratio of 1.0, and a flow time in the DIN 4 cup of 20 seconds was set by dilution with butyl acetate. As is apparent from the solids content measured, the solids content authoritative for the spray viscosity of each of the formulations for comparison, 1 and 2 and also 3 and 4, is at a level.

FIG. 1 shows the viscosity profile of the inventive polyisocyanate mixture B and of the polyisocyanate mixture A as comparative example. In this FIGURE, the solids content of the polyisocyanate mixtures (S.C., solids content in wt %) is plotted against the measured viscosity μ. It is clearly apparent that both polyisocyanates exhibited no difference in viscosity within the range between 40 and 60 wt % solids content that is important for the coatings industry. Furthermore, up to a solids content of more than 70 wt %, the viscosity is situated far apart, which is immaterial for the coatings industry. This result is surprising, since the polarity of the pentamethylene 1,5-diisocyanate-based polyisocyanate differs significantly from that of the hexamethylene 1,6-diisocyanate-based polyisocyanate, owing to the shorter linear aliphatic alkyl chain in the pentamethylene 1,5-diisocyanate. At even higher solids contents (≥80 wt %), the inventive polyisocyanate mixture has the expected higher viscosity relative to the polyisocyanate mixture of the comparative example.

Success has therefore been achieved with the inventive polyisocyanate mixture in producing a coatings base material having a significantly enhanced space-time yield in comparison to the conventional, HDI-based polyisocyanate mixtures, said inventive polyisocyanate mixture at the same time achieving the flow times in coating formulations that are needed for the finishing industry, without having to perform adaptations to the quantitative balance of established formulations.

The invention claimed is:

1. A polyisocyanate mixture comprising at least one polyisocyanate based on 1,5-diisocyanatopentane and at least one organic solvent, the organic solvent being inert toward isocyanate groups, and the polyisocyanate mixture having a solids content of a ≥35 and ≤65 wt %.

2. The polyisocyanate mixture of claim 1, the polyisocyanate having a degree of polymerization of ≥20%.

3. The polyisocyanate mixture of claim 2, the polyisocyanate having a degree of polymerization of ≥30%.

4. The polyisocyanate mixture of claim 1, the organic solvent being selected from the group of aromatic or aliphatic alkanes, alkenes, esters, ethers, nitriles, ketones or a mixture thereof.

5. The polyisocyanate mixture of claim 1, the polyisocyanate mixture having a viscosity at 23° C. of ≥3 and ≤500 mPa*s.

6. The polyisocyanate mixture of claim 5, the polyisocyanate mixture having a viscosity at 23° C. of ≥4 and ≤400 mPa*s.

7. The polyisocyanate mixture of claim 1, the polyisocyanate mixture prepared using 1,5-diisocyanatopentane as the sole diisocyanate, and having an average NCO functionality of 2 to 9.

8. The polyisocyanate mixture of claim 7, the polyisocyanate mixture prepared using 1,5-diisocyanatopentane as the sole diisocyanate, and having an average NCO functionality of 2.5 to 6.

9. The polyisocyanate mixture of claim 1, the polyisocyanate mixture prepared using 1,5-diisocyanatopentane as the sole diisocyanate, and having an isocyanate group content of 15.0 to 27.25 wt %, based on the total weight of polyisocyanate in the polyisocyanate mixture.

10. The polyisocyanate mixture of claim 9, the polyisocyanate mixture prepared using 1,5-diisocyanatopentane as the sole diisocyanate, and having an isocyanate group content of 19.0 to 23.0 wt %, based on the total weight of polyisocyanate in the polyisocyanate mixture.

11. The polyisocyanate mixture of claim 1, the polyisocyanate mixture prepared using 1,5-diisocyanatopentane as the sole diisocyanate, and having a monomeric 1,5-diisocyanatopentane content of less than 1.0 wt %.

12. The polyisocyanate mixture of claim 11, the polyisocyanate mixture prepared using 1,5-diisocyanatopentane as the sole diisocyanate, and having a monomeric 1,5-diisocyanatopentane content of less than 0.5 wt %.

13. The polyisocyanate mixture of claim 12, the polyisocyanate mixture prepared using 1,5-diisocyanatopentane as the sole diisocyanate, and having a monomeric 1,5-diisocyanatopentane content of less than 0.3 wt %.

14. A two-component system comprising a component I), comprising the polyisocyanate mixture of claim 1 and also, optionally, further auxiliaries and additives, and a component II), comprising at least one binder that is reactive toward isocyanate groups, and also, optionally, further auxiliaries and additives.

15. The two-component system of claim 14, the binder that is reactive toward isocyanate groups comprising at least one amino-, thio- and/or hydroxy-functional compound.

16. The two-component system of claim 15, wherein the binder that is reactive toward isocyanate groups comprises at least one hydroxy-functional compound.

17. A method for producing a coating, wherein the two-component system of claim 14 is mixed and is cured optionally with heating.

18. A coating produced by the method of claim 17.

19. An assembly comprising the coating of claim 18 and a substrate having a surface of metal, wood and/or plastic.

20. A method of producing a coating comprising depositing the two-component system of claim 14 on a substrate.

* * * * *